US012775999B2

(12) United States Patent
Mirhosseini

(10) Patent No.: US 12,775,999 B2
(45) Date of Patent: Oct. 27, 2026

(54) WARPING A FRAME BASED ON POSE AND WARPING DATA

(71) Applicant: Apple Inc., Cupertino, CA (US)

(72) Inventor: Seyedkoosha Mirhosseini, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 93 days.

(21) Appl. No.: 18/694,355

(22) PCT Filed: Sep. 8, 2022

(86) PCT No.: PCT/US2022/042897
§ 371 (c)(1),
(2) Date: Mar. 21, 2024

(87) PCT Pub. No.: WO2023/048955
PCT Pub. Date: Mar. 30, 2023

(65) Prior Publication Data

US 2024/0412320 A1 Dec. 12, 2024

Related U.S. Application Data

(60) Provisional application No. 63/247,938, filed on Sep. 24, 2021.

(51) Int. Cl.
*G06T 3/18* (2024.01)
*G06T 3/40* (2006.01)
*G06T 11/10* (2026.01)

(52) U.S. Cl.
CPC .................. *G06T 3/18* (2024.01); *G06T 3/40* (2013.01); *G06T 11/10* (2026.01)

(58) Field of Classification Search
CPC .... G06T 3/00; G06T 3/02; G06T 3/18; G06T 3/40; G06T 11/001; G06T 19/006; G06V 20/20
See application file for complete search history.

(56) References Cited

U.S. PATENT DOCUMENTS

| | | | |
|---|---|---|---|
| 8,767,011 | B1 | 7/2014 | Kornmann |
| 2018/0276824 | A1 | 9/2018 | Haraden et al. |
| 2019/0333263 | A1 | 10/2019 | Melkote Krishnaprasad et al. |

FOREIGN PATENT DOCUMENTS

| | | | |
|---|---|---|---|
| WO | 2017117675 | A1 | 7/2017 |

OTHER PUBLICATIONS

PCT International Search Report and Written Opinion dated Jan. 5, 2023, PCT International Application No. PCT/US2022/042897, pp. 1-11.

*Primary Examiner* — Antonio A Caschera
(74) *Attorney, Agent, or Firm* — Fernando & Partners, LLP

(57) ABSTRACT

In some implementations, a device includes an environmental sensor, a display, a non-transitory memory and one or more processors coupled with the environmental sensor, the display and the non-transitory memory. In some implementations, a method includes generating, at a first time, intermediate warping data for a warping operation to be performed on an application frame. In some implementations, the method includes obtaining, at a second time that occurs after the first time, via the environmental sensor, environmental data that indicates a pose of the device within a physical environment of the device. In some implementations, the method includes generating a warped application frame by warping the application frame in accordance with the pose of the device and the intermediate warping data. In some implementations, the method includes displaying the warped application frame on the display.

20 Claims, 8 Drawing Sheets

WARPING A FRAME BASED ON POSE AND WARPING DATA

CROSS-REFERENCE TO RELATED APPLICATION

This application claims the benefit of U.S. Provisional Patent App. No. 63/247,938, filed on Sep. 24, 2021, which is incorporated by reference in its entirety.

TECHNICAL FIELD

The present disclosure generally relates to warping a frame based on pose and warping data.

BACKGROUND

Some devices include applications that generate application frames. For example, some devices include a camera application that captures an image frame via an image sensor. These application frames may be presented on mobile communication devices.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
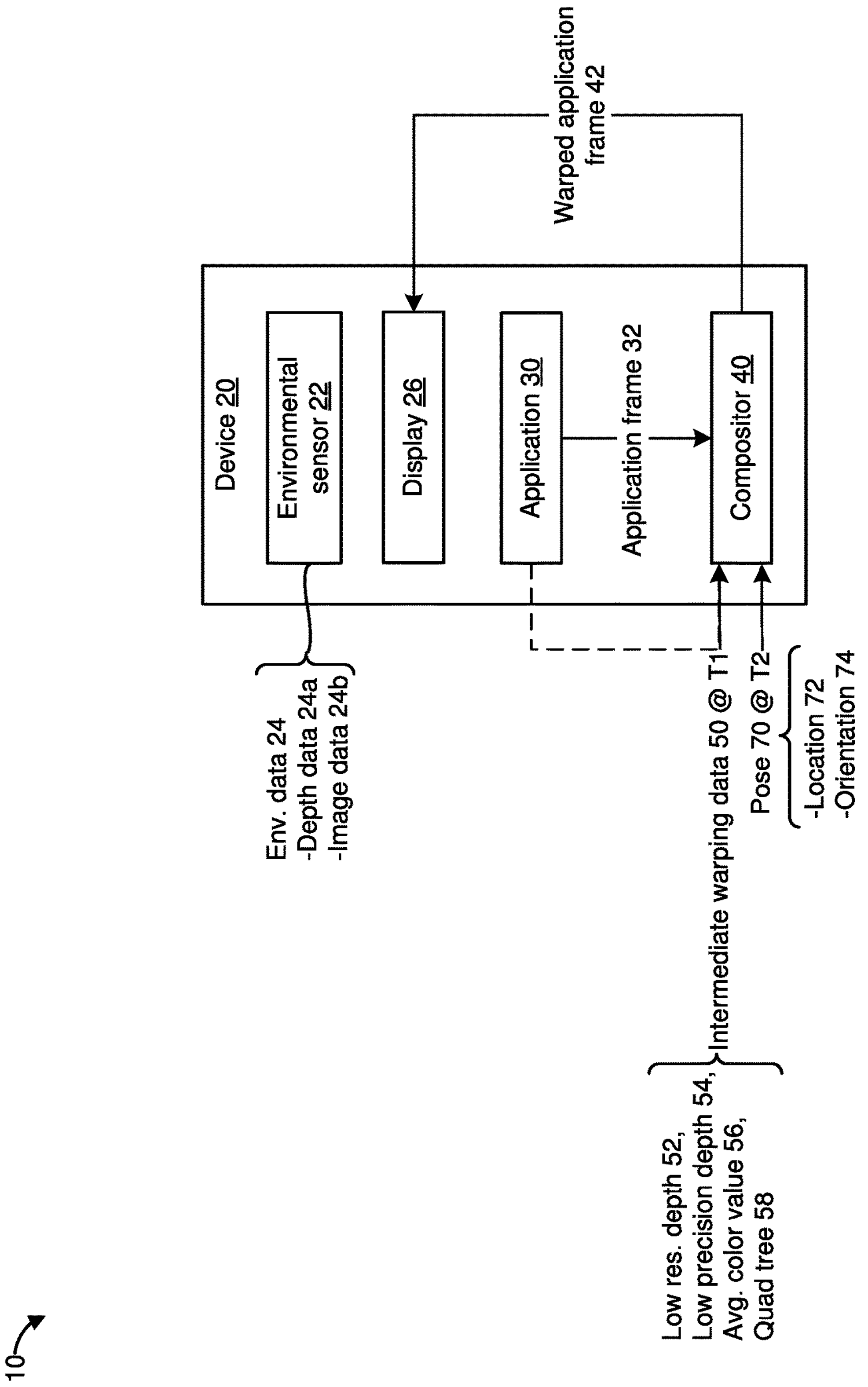
FIG. 1 is a diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for warping an application frame based on a pose of a device and intermediate warping data. In some implementations, a device includes an environmental sensor, a display, a non-transitory memory and one or more processors coupled with the environmental sensor, the display and the non-transitory memory. In some implementations, a method includes generating, at a first time, intermediate warping data for a warping operation to be performed on an application frame. In some implementations, the method includes obtaining, at a second time that occurs after the first time, via the environmental sensor, environmental data that indicates a pose of the device within a physical environment of the device. In some implementations, the method includes generating a warped application frame by warping the application frame in accordance with the pose of the device and the intermediate warping data. In some implementations, the method includes displaying the warped application frame on the display.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Some devices utilize a pose of the device to perform a warping operation. For example, a device may overlay visual elements onto an application frame based on a location and/or an orientation of the device relative to physical objects in the physical environment. Generally, the device obtains pose information of the device as late as possible so that the visual elements are composited at appropriate positions within the application frame. However, sometimes the warping operation is time-intensive and results in a delay in rendering the application frame. As such, warping can sometimes increase a latency of the device and degrade a user experience of the device.

The present disclosure provides methods, systems, and/or devices for warping an application frame with reduced latency by warping the application frame in a shorter time duration. A device warps an application frame in a shorter time duration by performing a pose-independent portion of the warping operation prior to obtaining a pose of the device and performing a pose-dependent portion of the warping operation after obtaining the pose of the device. Since the device performs the pose-independent portion of the warping operation prior to obtaining the pose, the device only has to perform the pose-dependent portion of the warping operation after obtaining the pose and not the pose-independent portion. By not having to perform the pose-independent portion of the warping operation after obtaining the pose, the device uses less time to complete the warping operation after obtaining the pose.

The pose-independent portion results in intermediate warping data that is used to perform the pose-dependent portion of the warping operation. The pose-independent portion of the warping operation does not rely on the pose of the device and can be performed before obtaining the pose of the device. By contrast, the pose-dependent portion of the warping operation relies on the pose of the device and is performed after obtaining the pose of the device. Splitting the warping operation into a pose-independent portion and a pose-dependent portion reduces an amount of time required for warping after obtaining the pose thereby reducing a latency of the device and improving a user experience of the device. Splitting the warping operating into the pose-independent portion and the pose-dependent portion allows the warping operating to be completed closer to a timing signal that serves as a trigger for rendering the warped application frame. Completing the warping operating closer to the timing signal results in a more accurate warp.

FIG. 1 is a diagram that illustrates an example operating environment 10 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 10 includes an electronic device 20 and a user (not shown) of the electronic device 20. In some implementations, the electronic device 20 includes a handheld computing device that can be held by the user. For example, in some implementations, the electronic device 20 includes a smartphone, a tablet, a media player, a laptop, or the like. In some implementations, the electronic device 20 includes a wearable computing device that can be worn by the user. For example, in some implementations, the electronic device 20 includes a head-mountable device (HMD) or an electronic watch. In some implementations, the operating environment 10 is referred to as a physical environment of the electronic device 20.

In some implementations, the electronic device 20 includes an environmental sensor 22 that captures environmental data 24 that corresponds to the operating environment 10. In some implementations, the environmental sensor 22 includes a depth sensor (e.g., a depth camera) and the environmental data 24 includes depth data 24*a* that is captured by the depth sensor. In some implementations, the environmental sensor 22 includes an image sensor (e.g., a camera, for example, an infrared (IR) camera or a visible light camera) and the environmental data 24 includes image data 24*b* that is captured by the image sensor. In some implementations, the electronic device 20 includes a tablet or a smartphone and the environmental sensor 22 includes a rear-facing camera of the tablet or the smartphone that the user points in a desired direction within the operating environment 10. In some implementations, the electronic device 20 includes a display 26.

As shown in FIG. 1, in some implementations, the electronic device 20 includes an application 30 that is installed on the electronic device 20. In various implementations, the application 30 generates application frames such as an application frame 32 shown in FIG. 1. In some implementations, the application 30 includes a camera application and the application frame 32 includes an image that is captured via the camera application. Alternatively, in some implementations, the application 30 includes a gaming application, a productivity application, a social networking application, a browser application, a messaging application, etc.

In various implementations, the electronic device 20 includes a compositor 40. In some implementations, the compositor 40 composites visual elements onto the application frame 32 generated by the application 30. For example, in some implementations, the compositor 40 overlays XR elements (e.g., AR elements) onto the application frame 32. In various implementations, the compositor 40 performs a warping operation on the application frame 32. Warping the application frame 32 results in a warped application frame 42 that the electronic device 20 presents on the display 26.

In various implementations, the electronic device 20 (e.g., the application 30 and/or the compositor 40) splits the warping operation into a pose-independent portion that does not rely on a pose 70 of the electronic device 20, and a pose-dependent portion that relies on the pose 70 of the electronic device 20. In various implementations, the electronic device 20 (e.g., the application 30 and/or the compositor 40) performs the pose-independent portion of the warping operation at a first time T1 that is prior to obtaining the pose 70 of the electronic device 20. In some implementations, performing the pose-independent portion of the warping operation results in intermediate warping data 50 that is used in the pose-dependent portion of the warping operation.

In some implementations, the electronic device 20 (e.g., the application 30 and/or the compositor 40) generates the intermediate warping data 50 based on the environmental data 24 captured by the environmental sensor 22. In some implementations, the intermediate warping data 50 includes low resolution depth data 52 for the operating environment 10. In some implementations, the low resolution depth data 52 is a modified version (e.g., a lower resolution version) of the depth data 24*a* captured by a depth sensor of the electronic device 20. In some implementations, the intermediate warping data 50 includes low precision depth data 54 for the operating environment 10. In some implementations, the low precision depth data 54 is a modified version (e.g., a lower precision version) of the depth data 24*a* captured by the depth sensor of the electronic device 20. In some implementations, the electronic device 20 generates the low resolution depth data 52 and/or the low precision depth data 54 by down-sampling the depth data 24*a* captured by the depth sensor of the electronic device 20. In some implementations, the electronic device 20 obtains the low resolution depth data 52 and/or the low precision depth data 54 by operating the depth sensor at a reduced capability (e.g., at a lower resolution, at a lower frequency and/or at a lower power-consumption setting).

In some implementations, the intermediate warping data 50 includes an average color value 56 of pixels in an image that is captured by an image sensor of the electronic device 20. For example, in some implementations, the image data 24*b* indicates respective color values of pixels and the average color value 56 is an average of the respective color values indicated by the image data 24*b*. In some implementations, the intermediate warping data 50 includes a quad tree representation 58 of the operating environment 10. In some implementations, the electronic device 20 generates the quad tree representation 58 based on the environmental data 24 (e.g., based on the depth data 24*a* and/or the image data 24*b*).

In some implementations, the application 30 generates the intermediate warping data 50, and the application 30 provides the intermediate warping data 50 to the compositor 40. Alternatively, in some implementations, the compositor 40 generates the intermediate warping data 50.

In various implementations, the compositor 40 obtains the pose 70 of the electronic device 20 at a second time T2 that is after the first time T1. In some implementations, the pose 70 indicates a location 72 of the electronic device 20 within the operating environment 10. For example, the pose 70 indicates the location 72 of the electronic device 20 relative to other objects in the operating environment 10. In some implementations, the pose 70 indicates an orientation 74 of the electronic device 20 within the operating environment 10. For example, the pose 70 indicates the orientation 74 of the electronic device 20 relative to other objects in the operating environment 10. In some implementations, the electronic device 20 (e.g., the compositor 40) determines the pose 70 based on the environmental data 24 captured by the environmental sensor 22. For example, in some implementations, the electronic device 20 generates the pose 70 based on the depth data 24*a* and/or the image data 24*b*.

In various implementations, the compositor 40 utilizes the intermediate warping data 50 and the pose 70 to complete the warping operation and generate the warped application frame 42. For example, in some implementations, the compositor 40 uses the intermediate warping data 50 and the pose 70 to perform the pose-dependent portion of the warping operation. Since the compositor 40 only has to perform the pose-dependent portion of the warping operation after obtaining the pose 70 and not the pose-dependent portion of the warping operation, it takes the compositor 40 less time to generate the warped application frame 42 after obtaining the pose 70.

In some implementations, the compositor 40 uses the low resolution depth data 52 and the pose 70 to perform the pose-dependent portion of the warping operation and generate the warped application frame 42. In some implementations, the compositor 40 uses the low precision depth data 54 to perform the pose-dependent portion of the warping operation and generate the warped application frame 42. In some implementations, the compositor 40 uses the low precision depth data 54 and the pose 70 to perform an occlusion operation (e.g., to occlude a portion of the operating environment 10 by compositing visual elements onto a portion of the application frame 32 that corresponds to the portion of the operating environment 10 that is being occluded). In some implementations, the compositor 40 uses the low precision depth data 54 and the pose 70 to perform a point-of-view correction (POVC) operation (e.g., to change a POV of the application frame 32).

In some implementations, the compositor 40 uses the average color value 56 and the pose 70 to perform a tone mapping operation and/or an accessibility operation. For example, the compositor 40 adjusts a color of visual elements that are being composited onto the application frame 32 based on the average color value 56 so that the color of the visual elements matches the color of the operating environment 10. In some implementations, the compositor 40 uses the quad tree representation 58 and the pose 70 to improve the warping operation (e.g., to perform a more accurate warping operation and/or to perform the warping operation in less time).

Figure 2A:
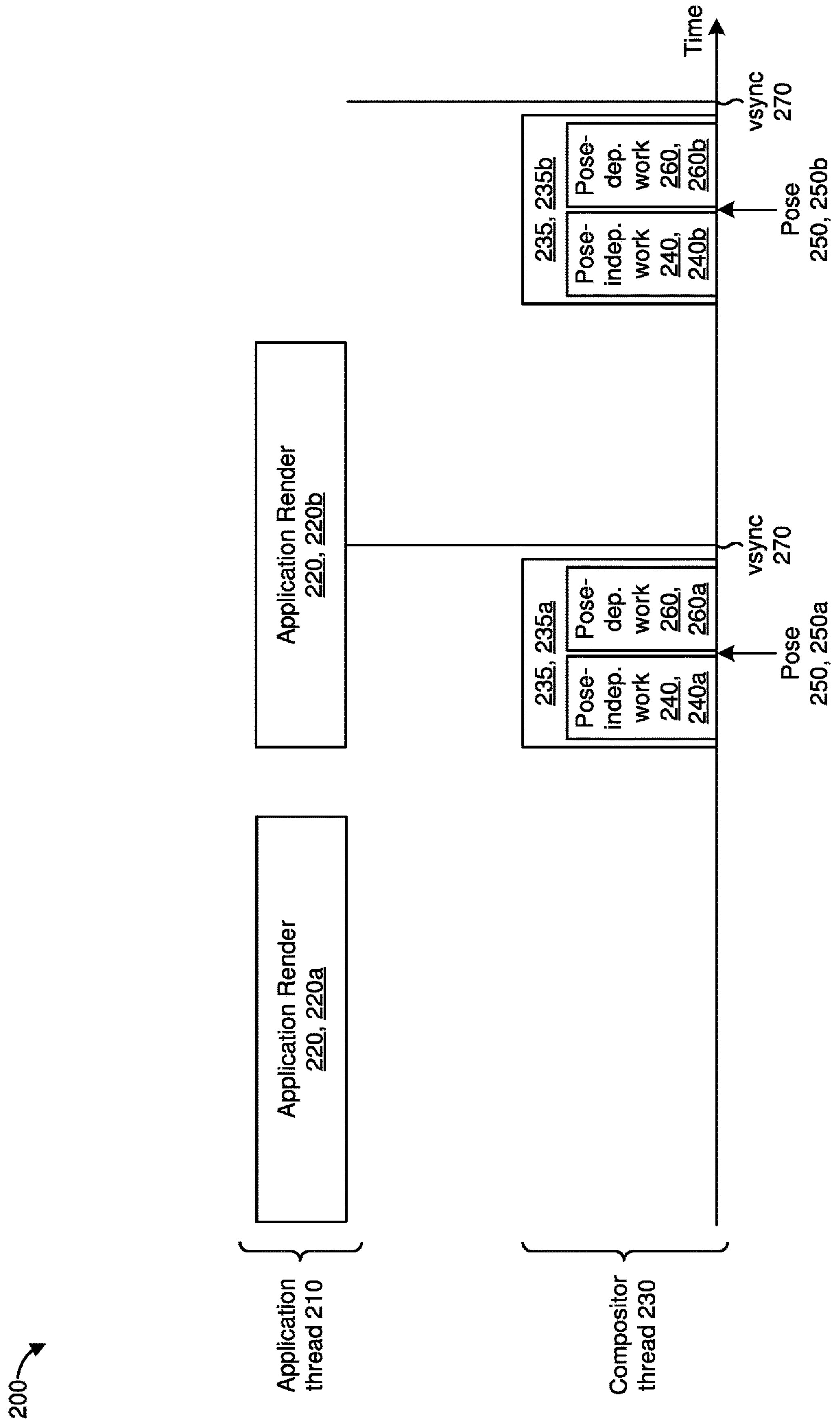
FIGS. 2A-2E are diagrams of a frame warping system in accordance with some implementations.

FIG. 2A illustrates a system 200 for warping an application frame (e.g., the application frame 32 shown in FIG. 1). In some implementations, the system 200 is implemented by the electronic device 20 shown in FIG. 1. For example, the system 200 resides at the electronic device 20 shown in FIG. 1. In some implementations, the system 200 includes an application thread 210 that is associated with the application 30 shown in FIG. 1 and a compositor thread 230 that is associated with the compositor 40 shown in FIG. 1. In some implementations, the application thread 210 refers to a processing pipeline of the application 30 and the compositor thread 230 refers to a processing pipeline of the compositor 40.

In some implementations, the application thread 210 includes various application rendering operations 220 ("application renders 220", hereinafter for the sake of brevity). For example, as shown in FIG. 2A, the application thread 210 includes a first application render 220*a* and a second application render 220*b*. In some implementations, the result of each application render 220 is an application frame (e.g., the application frame 32 shown in FIG. 1). For example, the first application render 220*a* results in a first application frame (not shown) and the second application render 220*b* results in a second application frame (not shown).

In some implementations, the compositor thread 230 includes various compositing operations 235. In the example of FIG. 2A, the compositor thread 230 includes a first compositing operation 235*a* for the first application render 220*a* and a second compositing operation 235*b* for the second application render 220*b*. In some implementations, each compositing operation 235 includes different portions of warping operations. As shown in FIG. 2A, in various implementations, the system 200 splits each compositing operation 235 into pose-independent portions 240 ("pose-independent work 240", hereinafter for the sake of brevity) of warping operations that do not rely on poses 250 and pose-dependent portions 260 ("pose-dependent work 260", hereinafter for the sake of brevity) of warping operations that rely on the poses 250. The pose-independent work 240 results in intermediate warping data (e.g., the intermediate warping data 50 shown in FIG. 1). The pose-dependent work 260 uses the intermediate warping data and the pose 250 to generate warped application frames.

In the example of FIG. 2A, the system 200 splits (e.g., segregates) the first compositing operation 235*a* into first pose-independent work 240*a* for the first application render 220*a* that is performed prior to obtaining a first pose 250*a* and first pose-dependent work 260*a* for the first application render 220*a* that is performed after obtaining the first pose 250*a*. Performing the first pose-independent work 240*a*, obtaining the first pose 250*a* and performing the first pose-dependent work 260*a* results in a first warped application frame that is presented at a time corresponding to a first instance of a timing signal 270.

Similarly, the system 200 splits the second compositing operation 235*b* into second pose-independent work 240*b* for the second application render 220*b* that is performed prior to obtaining a second pose 250*b* and second pose-dependent work 260*b* for the second application render 220*b* that is performed after obtaining the second pose 250*b*. Performing the second pose-independent work 240*b*, obtaining the second pose 250*b* and performing the second pose-dependent work 260*b* results in a second warped application frame that is presented at a time corresponding to a second instance of the timing signal 270.

Advantageously, since the pose-independent work 260 is performed prior to obtaining the poses 250, an amount of time required to complete the warping is reduced, thereby reducing a latency of the system 200 and enhancing a user experience provided by the system 200. Furthermore, since a portion of the warping operation (e.g., pose-independent work 260) can be performed without the poses 250, the time at which the poses 250 are obtained can be delayed. Getting the poses 250 as late as possible results in more accurate warping because there is less time for the pose of the electronic device 20 to change. In other words, the poses 250 are more likely to represent actual poses of the electronic device 20 at times corresponding to the timing signal 270.

Figure 2B:
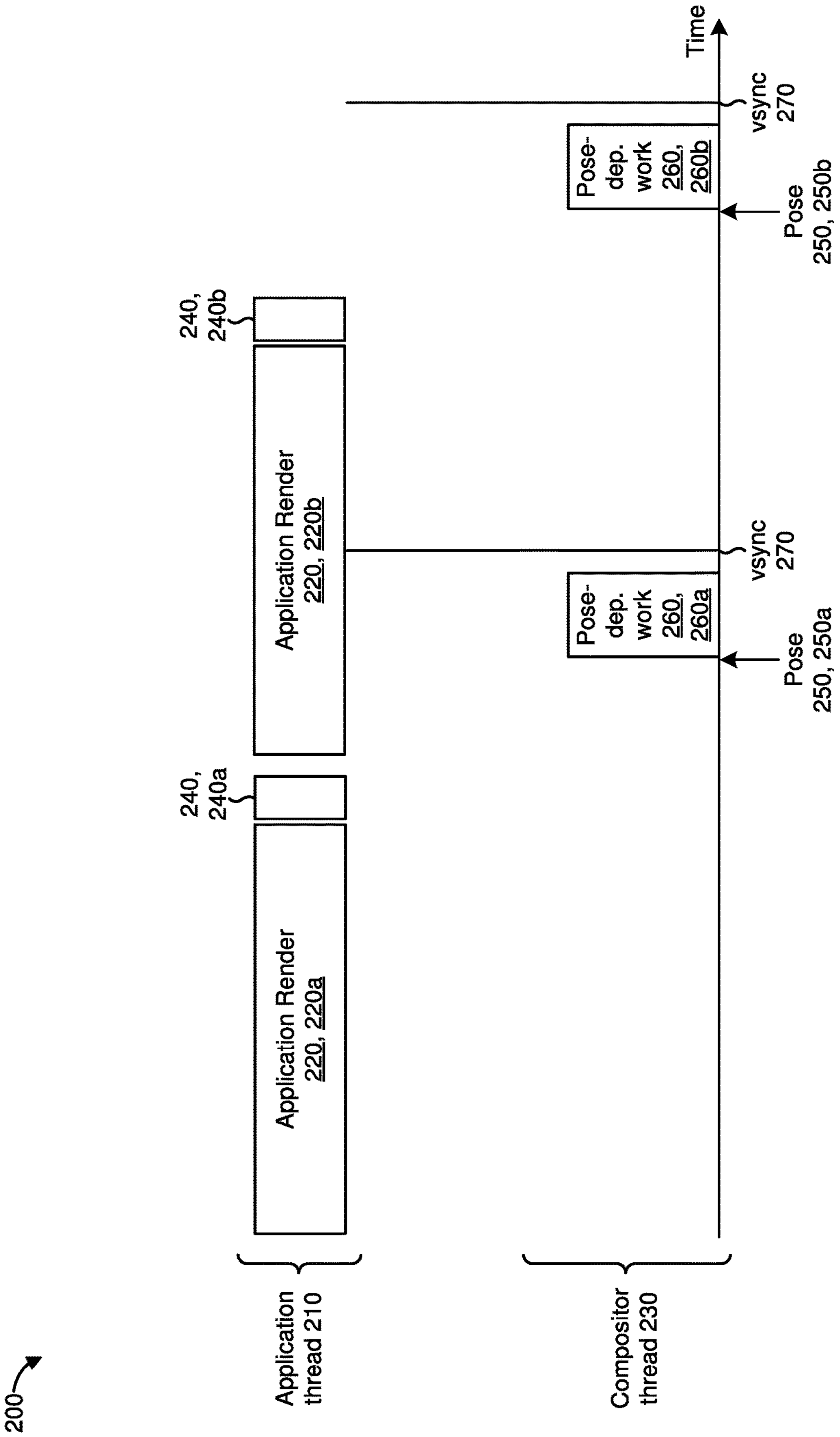

Referring to FIG. 2B, in some implementations, the pose-independent work 240 is included in the application thread 210. When the pose-independent work 240 is included in the application thread 210 instead of the compositor thread 230, the application 30 performs the pose-independent work 240 instead of the compositor 40. In the example of FIG. 2B, the pose-independent work 240 appears immediately after the application renders 220. As such, the application 30 performs the pose-independent work 240 immediately after generating the application frames. For example, the application 30 performs the first pose-independent work 240*a* immediately after generating the first application frame, and the application 30 performs the second pose-independent work 240*b* immediately after generating the second application frame. Shifting the pose-independent work 240 from the compositor 40 to the application 30 reduces a load on the compositor 40. In the example of FIG. 2B, the application 30 provides a result of the pose-independent work 240 (e.g., the intermediate warping data 50 shown in FIG. 1) to the compositor 40, and the compositor 40 uses the result of the pose-independent work 240 to perform the pose-dependent work 260.

Figure 2C:
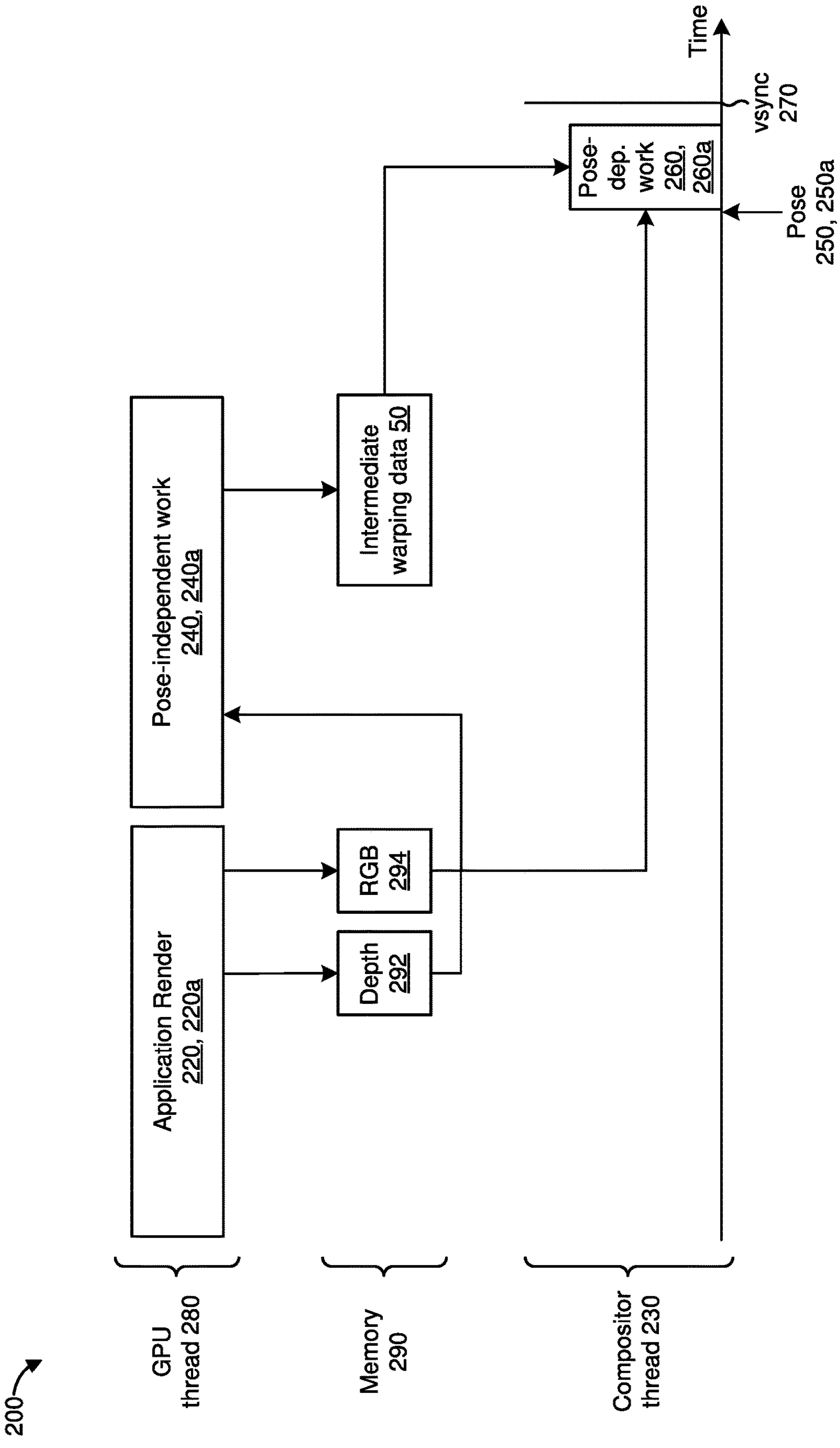

Referring to FIG. 2C, in some implementations, the application render 220 and the pose-independent work 240 are included in a graphics processing unit (GPU) thread 280. In some implementations, the application render 220 results in depth information 292 and RGB information 294 (e.g., pixel color values). As shown in FIG. 2C, in some implementations, the depth information 292 and the RGB information 294 resulting from the application render 220 is stored in a memory 290. In some implementations, the GPU retrieves the depth information 292 and the RGB information 294 from the memory 290 at a later time when the GPU is performing the pose-independent work 240. In some implementations, the compositor 40 retrieves the depth information 292 and the RGB information 294 from the memory 290 at a later time when the compositor 40 is performing the pose-dependent work 260. As shown in FIG. 2C, in some implementations, the intermediate warping data 50 resulting from the pose-independent work 240 is stored in the memory 290, and the compositor 40 retrieves the intermediate warping data 50 from the memory 290 when the compositor 40 performs the pose-dependent work 260.

Figure 2D:
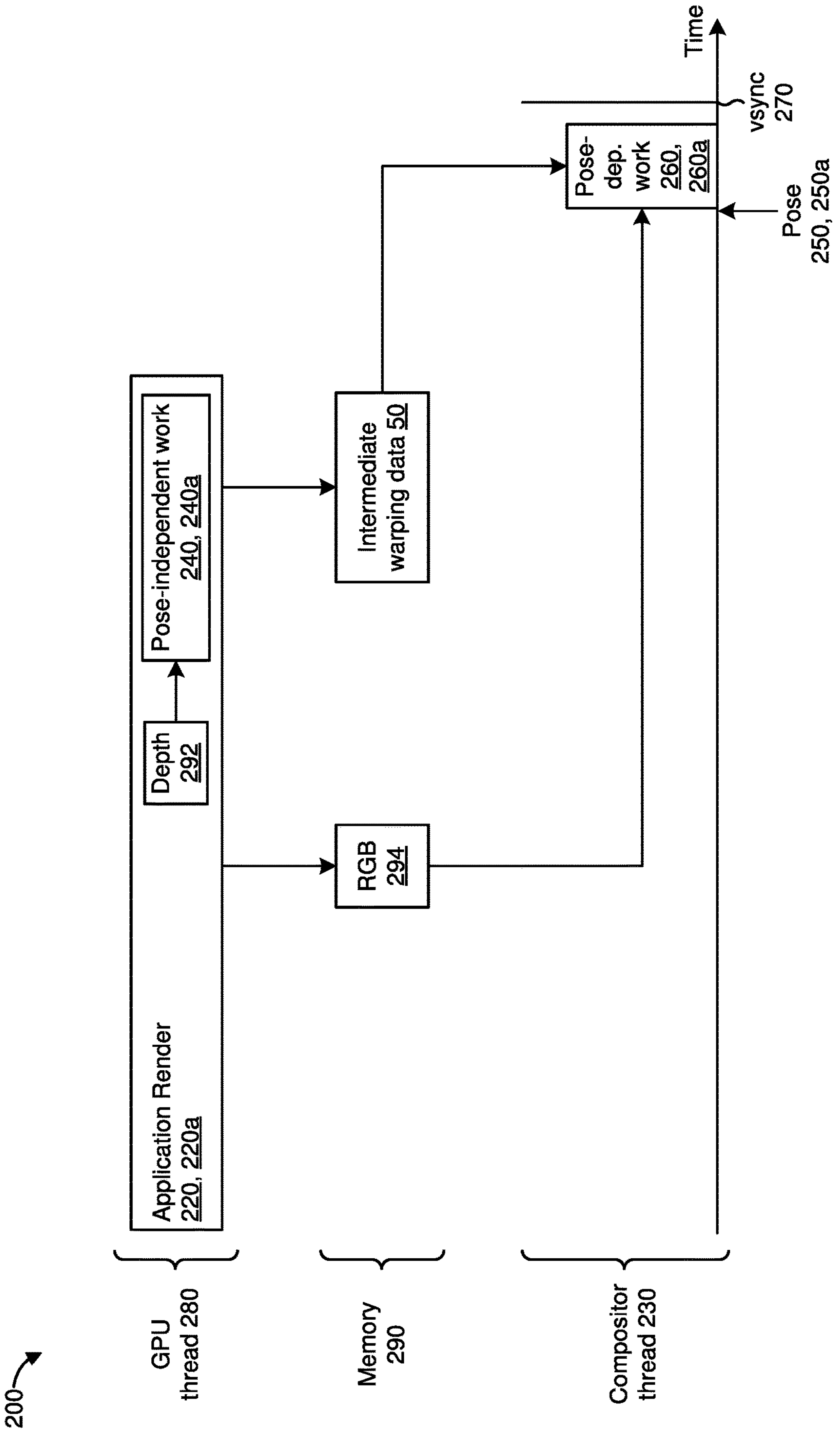

Referring to FIG. 2D, in some implementations, the pose-independent work 240 is performed during the application render 220. Performing the pose-independent work 240 as a part of the application render 220 is sometimes referred to as in-line compositing. In-line compositing further reduces a latency of the system 200 by reducing an amount of time required for the warping operation after the application render 220. As shown in FIG. 2D, in some implementations, when the pose-independent work 240 is performed as a part of the application render 220, the pose-independent work 240 uses the depth information 292 and the pose-dependent work 260 does not utilize the depth information 292. In the example of FIG. 2D, the RGB information 294 is saved into the memory 290, however, the depth information 292 is not saved into the memory 290 thereby reducing time and processing associated with saving the depth information 292 in the memory 290 and retrieving the depth information 292 by the compositor 40.

Figure 2E:
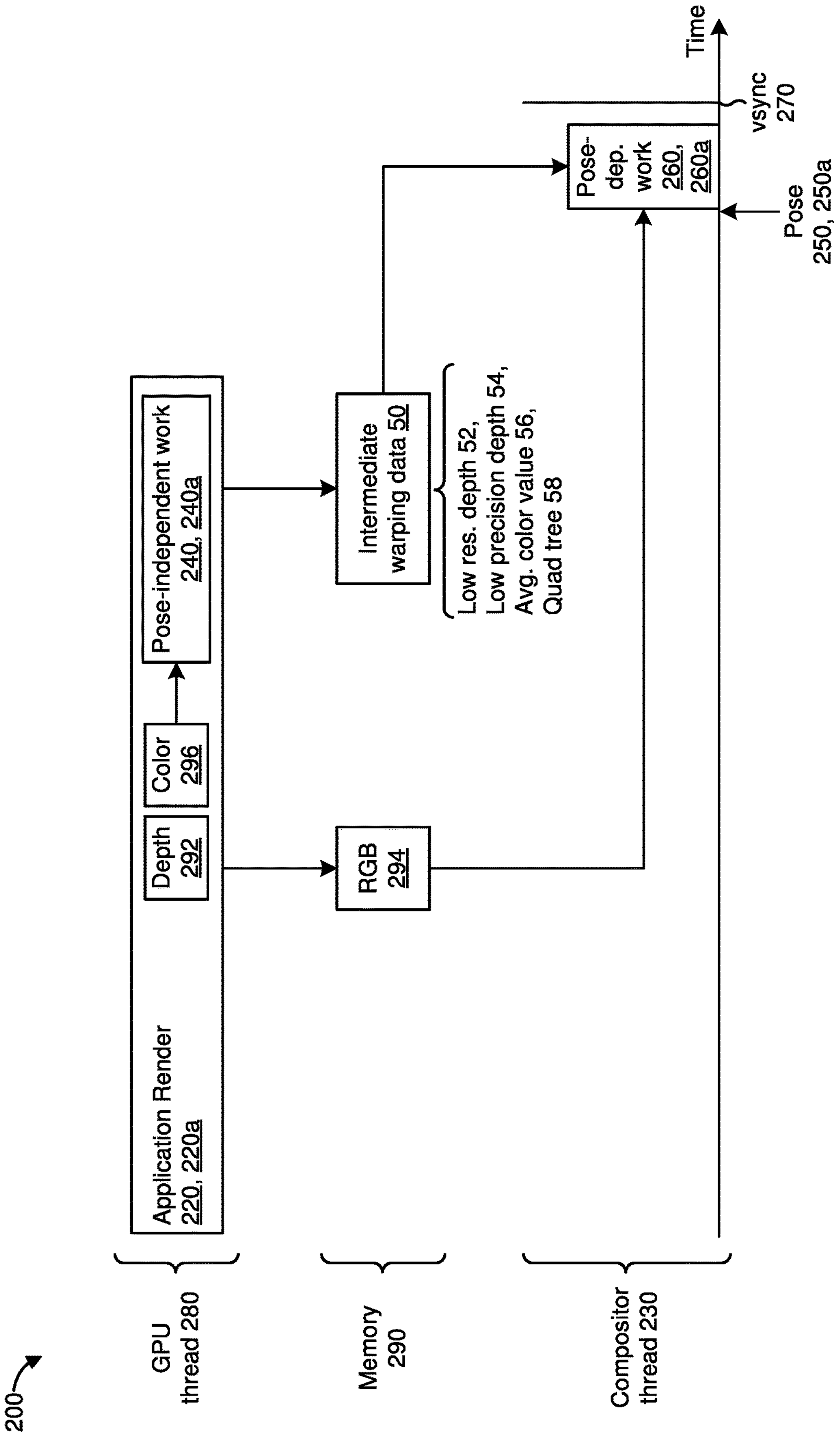

Referring to FIG. 2E, in some implementations, the pose-independent work 240 utilizes color information 296 in addition to the depth information 292. In some implementations, the application 30 determines the color information 296 from the RGB information 294. In some implementations, the color information 296 includes an average color value that the application 30 determines by averaging respective color values of pixels indicated by the RGB information 294. As described in relation to FIG. 1, in some implementations, the intermediate warping data 50 includes the low resolution depth data 52, the low precision depth data 54, the average color value 56 and/or the quad tree representation 58.

Figure 3:
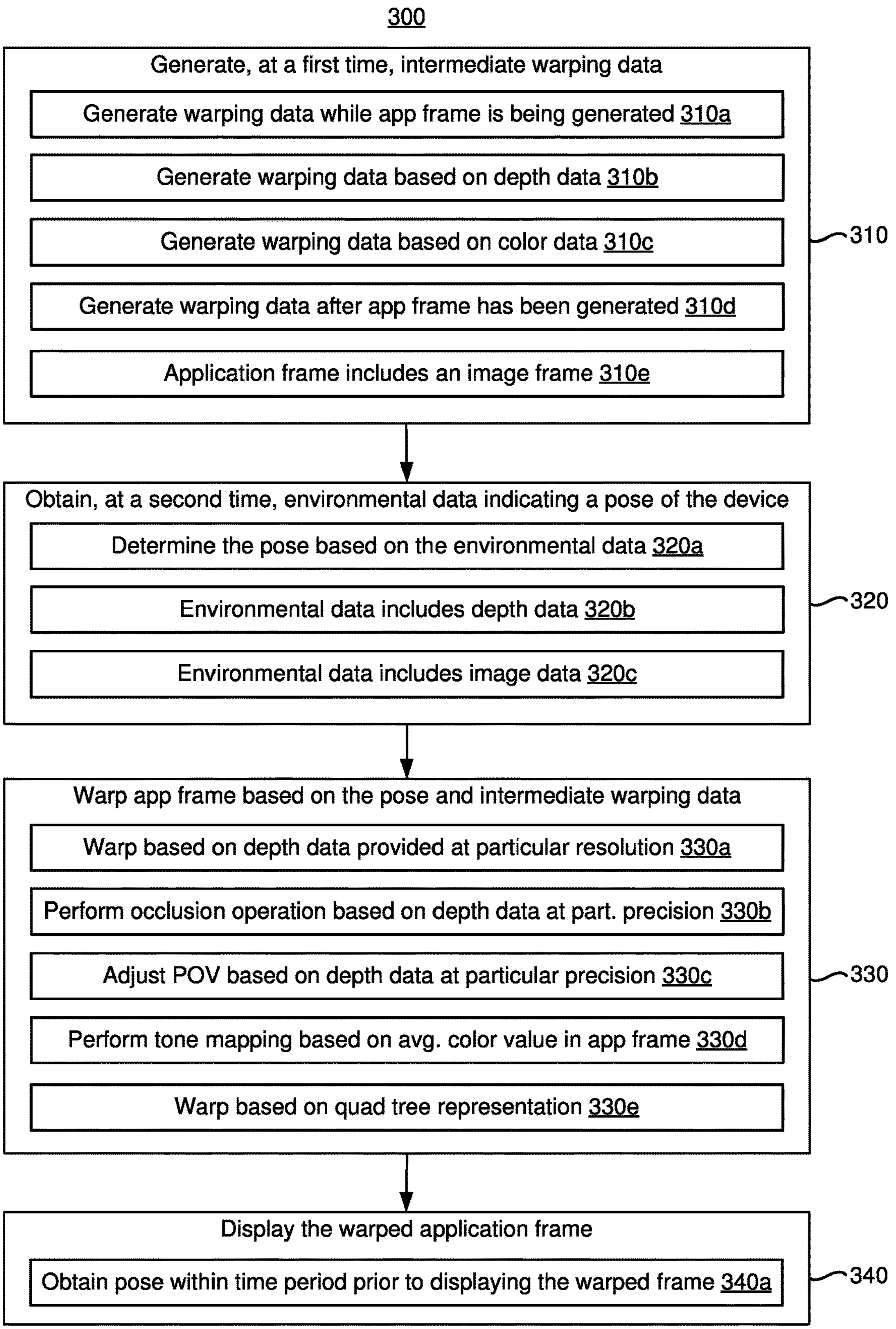
FIG. 3 is a flowchart representation of a method of warping an application frame in accordance with some implementations.

FIG. 3 is a flowchart representation of a method 300 for warping an application frame based on intermediate warping data and pose of a device. In various implementations, the method 300 is performed by a device (e.g., the electronic device 20 shown in FIG. 1 and/or the system 200 shown in FIGS. 2A-2E). In some implementations, the method 300 is performed by processing logic, including hardware, firmware, software, or a combination thereof. In some implementations, the method 300 is performed by a processor executing code stored in a non-transitory computer-readable medium (e.g., a memory).

As represented by block 310, in various implementations, the method 300 includes generating, at a first time, intermediate warping data for a warping operation to be performed on an application frame. For example, as shown in FIG. 1, the electronic device 20 (e.g., the application 30 and/or the compositor 40) generates the intermediate warping data 50 for a warping operation that is to be performed on the application frame 32. As shown in FIG. 1, the compositor 40 obtains (e.g., generates or receives) the intermediate warping data 50 at a first time T1.

As represented by block 310*a*, in some implementations, the intermediate warping data is generated while the application frame is being generated and the warped application frame is generated after the application frame has been generated. For example, as shown in FIGS. 2D and 2E, in some implementations, the intermediate warping data 50 is generated as a part of the application render 220. More generally, in various implementations, the intermediate warping data 50 and the application frame 32 are generated concurrently. As such, a portion of the warping operation (e.g., the pose-independent work 240 shown in FIGS. 2D and 2E) can be performed before the application frame is generated thereby reducing an amount of time required to complete the warping operation after the application frame has been generated.

As represented by block 310*b*, in some implementations, generating the intermediate warping data includes generating the intermediate warping data based on depth data corresponding to the physical environment. For example, as discussed in relation to FIG. 1, in some implementations, the electronic device 20 generates the intermediate warping data 50 based on the depth data 24*a* that is captured by the environmental sensor 22. In some implementations, the intermediate warping data 50 includes the low resolution depth data 52 and/or the low precision depth data 54.

As represented by block 310*c*, in some implementations, generating the intermediate warping data includes generating the intermediate warping data based on color data corresponding to the physical environment. For example, as shown in FIG. 2E, in some implementations, the pose-independent work 240 utilizes the color information 296. As illustrated in FIGS. 1 and 2E, in some implementations, the intermediate warping data 50 includes the average color value 56.

As represented by block 310*d*, in some implementations, the intermediate warping data is generated after the application frame has been generated and before determining the pose of the device. For example, as shown in FIGS. 2A-2C, in some implementations, the pose-independent work 240 is performed after (e.g., immediately after) the application render 220 and before obtaining the pose 250. In some implementations, the method 300 includes generating the intermediate warping data in response to determining that the application frame has been generated.

As represented by block 310*e*, in some implementations, the application frame includes an image frame that is captured via a camera application. For example, referring to FIG. 1, in some implementations, the application 30 includes a camera application that is installed on the electronic device 20 and the application frame 32 includes an image frame that is captured via the camera application (e.g., when a user of the electronic device 20 presses an image camera button displayed within a graphical user interface (GUI) presented by the camera application).

As represented by block 320, in some implementations, the method 300 includes obtaining, at a second time that occurs after the first time, via the environmental sensor, environmental data that indicates a pose of the device within a physical environment of the device. For example, as shown in FIG. 1, the electronic device 20 (e.g., the compositor 40) obtains the pose 70 of the electronic device 20 at the second time T2 that occurs after the first time T1. In some implementations, the pose of the device indicates a location of the device relative to other physical articles in a physical environment surrounding the device. In some implementations, the pose of the device indicates an orientation of the device relative to the other physical articles in the physical environment surrounding the device.

As represented by block 320*a*, in some implementations, the method 300 includes determining the pose of the device based on the environmental data. In some implementations, the method 300 includes determining the pose of the device based on a distance and/or an orientation of the device relative to a physical object in the physical environment.

As represented by block 320*b*, in some implementations, the environmental sensor includes a depth sensor and obtaining the environmental data includes obtaining depth data via the depth sensor. In such implementations, the method 300 includes determining the pose of the device based on the depth data captured by the depth sensor. For example, referring to FIG. 1, in some implementations, the electronic device 20 (e.g., the application 30 and/or the compositor 40) determines the pose 70 based on the depth data 24*a* captured by the depth sensor.

As represented by block 320*c*, in some implementations, the environmental sensor includes an image sensor and obtaining the environmental data includes obtaining image data via the image sensor. In such implementations, the method 300 includes determining the pose of the device based on the image data captured by the image sensor. For example, referring to FIG. 1, in some implementations, the electronic device 20 (e.g., the application 30 and/or the compositor 40) determines the pose 70 based on the image data 24*b* captured by the image sensor.

As represented by block 330, in some implementations, the method 300 includes generating a warped application frame by warping the application frame in accordance with the pose of the device and the intermediate warping data. For example, as shown in FIG. 1, the compositor 40 uses the intermediate warping data 50 and the pose 70 to generate the warped application frame 42. Furthermore, as illustrated in FIGS. 2C-2E, the compositor 40 performs the pose-dependent work 260 based on the intermediate warping data 50 and the pose 250.

As represented by block 330*a*, in some implementations, the intermediate warping data includes depth data of the physical environment at a particular resolution that is lower than a threshold resolution, and generating the warped application frame includes warping the application frame based on the depth data at the particular resolution. For example, as shown in FIGS. 1 and 2E, in some implementations, the intermediate warping data 50 includes the low resolution depth data 52, and the compositor 40 uses the low resolution depth data 52 to perform the pose-dependent work 260.

As represented by block 330*b*, in some implementations, the intermediate warping data includes depth data of the physical environment at a particular precision that is lower than a threshold precision, and generating the warped application frame includes performing an occlusion operation based on the depth data at the particular precision in order to occlude a physical object in the physical environment. For example, as shown in FIGS. 1 and 2E, in some implementations, the intermediate warping data 50 includes the low precision depth data 54. In some implementations, the compositor 40 uses the low precision depth data 54 to occlude a portion of a physical article by compositing an XR element on top of the portion of the physical article.

As represented by block 330*c*, in some implementations, the intermediate warping data includes depth data of the physical environment at a particular precision that is lower than a threshold precision, and generating the warped application frame includes performing a point-of-view (POV) adjustment operation based on the depth data at the particular precision in order to adjust a POV of the application frame. For example, as shown in FIGS. 1 and 2E, in some implementations, the intermediate warping data 50 includes the low precision depth data 54. In some implementations, the compositor 40 uses the low precision depth data 54 to change a POV of the application frame to a new POV.

As represented by block 330*d*, in some implementations, the intermediate warping data indicates an average color value of a plurality of pixels in the application frame, and generating the warped application frame includes performing a tone mapping operation by modifying a color value of virtual content that is to be composited onto the application frame based on the average color value of the plurality of pixels in the application frame. For example, as shown in FIGS. 1 and 2E, in some implementations, the intermediate warping data 50 includes the average color value 56. In some implementations, the compositor 40 uses the average color value 56 to match a color value of virtual content that is being composited on the application frame with colors of the physical environment.

As represented by block 330*e*, in some implementations, the intermediate warping data includes a quad tree representation of the physical environment, and generating the warped application frame includes warping the application frame based on the quad tree representation of the physical environment. For example, as shown in FIGS. 1 and 2E, in some implementations, the intermediate warping data 50 includes the quad tree representation 58. In some implementations, the compositor 40 uses the quad tree representation 58 to perform the pose-dependent work 260. In some implementations, using the quad tree representation 58 results in a more accurate warping and/or a more efficient warping (e.g., a warping that takes less time to complete).

As represented by block 340, in various implementations, the method 300 includes displaying the warped application frame on the display. For example, as shown in FIG. 1, the electronic device 20 displayed the warped application frame 42 on the display 26. As represented by block 340*a*, in some implementations, the warped application frame is displayed at a third time that corresponds to a timing signal associated with the display, and a difference between the second time at which the environmental data indicating the pose is obtained and the third time at which the warped application frame is displayed matches an amount of time associated with warping the application frame. For example, as shown in FIGS. 2A-2E, the pose 250 is obtained (e.g., determined) immediately prior to starting the pose-dependent work 260.

Figure 4:
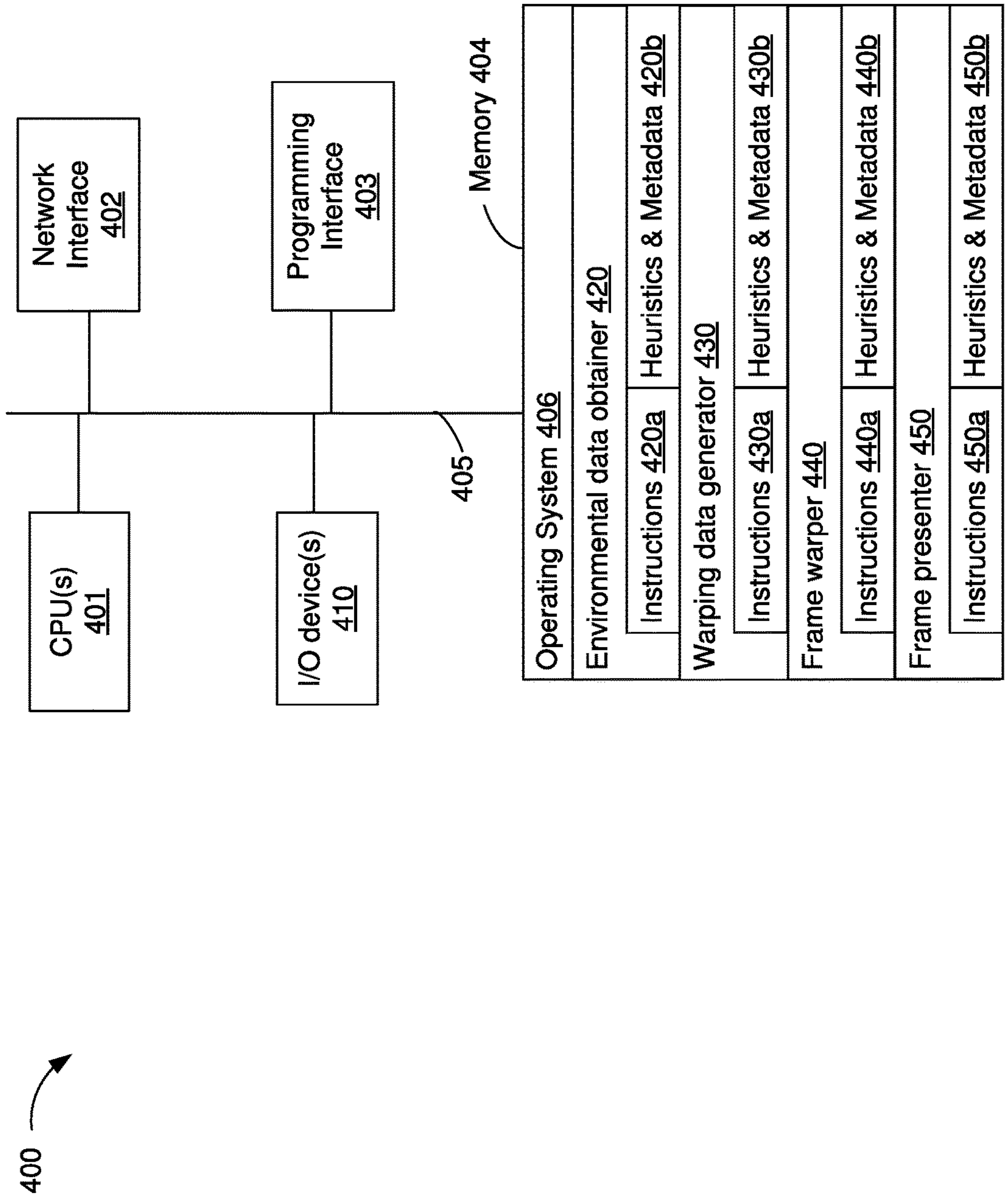
FIG. 4 is a block diagram of a device that warps an application frame in accordance with some implementations.

FIG. 4 is a block diagram of a device 400 in accordance with some implementations. In some implementations, the device 400 implements the electronic device 20 shown in FIG. 1 and/or the system 200 shown in FIGS. 2A-2E. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 400 includes one or more processing units (CPUs) 401, a network interface 402, a programming interface 403, a memory 404, one or more input/output (I/O) devices 410, and one or more communication buses 405 for interconnecting these and various other components.

In some implementations, the network interface 402 is provided to, among other uses, establish and maintain a metadata tunnel between a cloud hosted network management system and at least one private network including one or more compliant devices. In some implementations, the one or more communication buses 405 include circuitry that interconnects and controls communications between system components. The memory 404 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 404 optionally includes one or more storage devices remotely located from the one or more CPUs 401. The memory 404 comprises a non-transitory computer readable storage medium.

In some implementations, the memory 404 or the non-transitory computer readable storage medium of the memory 404 stores the following programs, modules and data structures, or a subset thereof including an optional operating system 406, an environmental data obtainer 420, a warping data generator 430, a frame warper 440 and a frame presenter 450. In various implementations, the device 400 performs the method 300 shown in FIG. 3.

In some implementations, the environmental data obtainer 420 includes instructions 420*a*, and heuristics and metadata 420*b* for obtaining (e.g., receiving and/or capturing) the environmental data 24 shown in FIG. 1. In some implementations, the environmental data obtainer 420 performs at least some of the operation(s) represented by block 320 in FIG. 3.

In some implementations, the warping data generator 430 includes instructions 430*a*, and heuristics and metadata 430*b* for generating the intermediate warping data 50 shown in FIGS. 1 and 2C-2E. In some implementations, the warping data generator 430 performs at least some of the operation(s) represented by block 310 in FIG. 3.

In some implementations, the frame warper 440 includes instructions 440*a*, and heuristics and metadata 440*b* for generating a warped application frame by warping an application frame based on the intermediate warping data and the pose of the device 400. For example, the frame warper 440 uses the intermediate warping data 50 and the pose 70 to warp the application frame 32 and generate the warped application frame 42 shown in FIG. 1. In some implementations, the frame warper 440 performs at least some of the operation(s) represented by block 330 in FIG. 3.

In some implementations, the frame presenter 450 includes instructions 450*a*, and heuristics and metadata 450*b* for presenting a warped application frame (e.g., the warped application frame 42 shown in FIG. 1). In some implementations, the frame presenter 450 performs at least some of the operation(s) represented by block 340 in FIG. 3.

In some implementations, the one or more I/O devices 410 include an input device for obtaining inputs (e.g., a touchscreen for detecting user inputs). In some implementations, the one or more I/O devices 410 include an environmental sensor (e.g., the environmental sensor 22 shown in FIG. 1). In some implementations, the one or more I/O devices 410 include a depth sensor (e.g., a depth camera) for capturing the depth data 24*a* shown in FIG. 1. In some implementations, the one or more I/O devices 410 include an image sensor (e.g., a camera, for example, a visible light camera or an infrared light camera) for capturing the image data 24*b* shown in FIG. 1. In some implementations, the one or more I/O devices 410 include a display (e.g., the display 26 shown in FIG. 1).

In various implementations, the one or more I/O devices 410 include a video pass-through display which displays at least a portion of a physical environment surrounding the device 400 as an image captured by a camera. In various implementations, the one or more I/O devices 410 include an optical see-through display which is at least partially transparent and passes light emitted by or reflected off the physical environment.

It will be appreciated that FIG. 4 is intended as a functional description of the various features which may be present in a particular implementation as opposed to a structural schematic of the implementations described herein. As recognized by those of ordinary skill in the art, items shown separately could be combined and some items could be separated. For example, some functional blocks shown separately in FIG. 4 could be implemented as a single block, and the various functions of single functional blocks could be implemented by one or more functional blocks in various implementations. The actual number of blocks and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

What is claimed is:

1. A method comprising:

at a device including an environmental sensor, a display, a non-transitory memory and one or more processors coupled with the environmental sensor, the display and the non-transitory memory:

generating, at a first time, intermediate warping data for a warping operation to be performed on an application frame, wherein the intermediate warping data is generated while the application frame is being generated, and wherein generating the intermediate warping data comprises performing a pose-independent portion of the warping operation that does not rely on a pose of the device;

obtaining, at a second time that occurs after the first time, via the environmental sensor, environmental data that indicates the pose of the device within a physical environment of the device;

generating, after the application frame has been generated, a warped application frame by warping the application frame in accordance with the pose of the device and the intermediate warping data; and displaying the warped application frame on the display.

2. The method of claim 1, wherein the intermediate warping data includes depth data of the physical environment at a particular resolution that is lower than a threshold resolution; and wherein generating the warped application frame includes warping the application frame based on the depth data at the particular resolution.

3. The method of claim 1, wherein the intermediate warping data includes depth data of the physical environment at a particular precision that is lower than a threshold precision; and wherein generating the warped application frame includes performing an occlusion operation based on the depth data at the particular precision in order to occlude a physical object in the physical environment.

4. The method of claim 1, wherein the intermediate warping data includes depth data of the physical environment at a particular precision that is lower than a threshold precision; and wherein generating the warped application frame includes performing a point-of-view (POV) adjustment operation based on the depth data at the particular precision in order to adjust a POV of the application frame.

5. The method of claim 1, wherein the intermediate warping data indicates an average color value of a plurality of pixels in the application frame; and wherein generating the warped application frame includes performing a tone mapping operation by modifying a color value of virtual content that is to be composited onto the application frame based on the average color value of the plurality of pixels in the application frame.

6. The method of claim 1, wherein the intermediate warping data includes a quad tree representation of the physical environment; and wherein generating the warped application frame includes warping the application frame based on the quad tree representation of the physical environment.

7. The method of claim 1, further comprising determining the pose of the device based on the environmental data.

8. The method of claim 7, wherein determining the pose of the device comprises determining the pose of the device based on a distance and an orientation of the device relative to a physical object in the physical environment.

9. The method of claim 1, wherein the environmental sensor includes a depth sensor and wherein obtaining the environmental data includes obtaining depth data via the depth sensor.

10. The method of claim 1, wherein the environmental sensor includes an image sensor and wherein obtaining the environmental data includes obtaining image data via the image sensor.

11. The method of claim 1, wherein generating the intermediate warping data comprises generating the intermediate warping data based on depth data corresponding to the physical environment.

12. The method of claim 1, wherein generating the intermediate warping data comprises generating the intermediate warping data based on color data corresponding to the physical environment.

13. The method of claim 1, wherein the intermediate warping data is generated after the application frame has been generated and before determining the pose of the device.

14. The method of claim 1, wherein the warped application frame is displayed at a third time that corresponds to a timing signal associated with the display; and wherein a difference between the second time at which the environmental data indicating the pose is obtained and the third time at which the warped application frame is displayed matches an amount of time associated with warping the application frame.

15. The method of claim 1, wherein the application frame includes an image frame that is captured via a camera application.

16. A device comprising:

one or more processors;

an environmental sensor;

a display;

a non-transitory memory; and one or more programs stored in the non-transitory memory, which, when executed by the one or more processors, cause the device to:

generate, at a first time, intermediate warping data for a warping operation to be performed on an application frame, wherein the intermediate warping data is generated while the application frame is being generated, and wherein generating the intermediate warping data comprises performing a pose-independent portion of the warping operation that does not rely on a pose of the device;

obtain, at a second time that occurs after the first time, via the environmental sensor, environmental data that indicates the pose of the device within a physical environment of the device;

generate, after the application frame has been generated, a warped application frame by warping the application frame in accordance with the pose of the device and the intermediate warping data; and display the warped application frame on the display.

17. The device of claim 16, wherein the warped application frame is displayed at a third time that corresponds to a timing signal associated with the display; and wherein a difference between the second time at which the environmental data indicating the pose is obtained and the third time at which the warped application frame is displayed matches an amount of time associated with warping the application frame.

18. A non-transitory memory storing one or more programs, which, when executed by one or more processors of a device including a display and an environmental sensor, cause the device to:

generate, at a first time, intermediate warping data for a warping operation to be performed on an application frame, wherein the intermediate warping data is generated while the application frame is being generated, and wherein generating the intermediate warping data comprises performing a pose-independent portion of the warping operation;

obtain, at a second time that occurs after the first time, via the environmental sensor, environmental data that indicates a pose of the device within a physical environment of the device;

generate, after the application frame has been generated, a warped application frame by warping the application frame in accordance with the pose of the device and the intermediate warping data; and display the warped application frame on the display.

19. The non-transitory memory of claim 18, wherein the intermediate warping data includes depth data of the physical environment at a particular resolution that is lower than a threshold resolution; and wherein generating the warped application frame includes warping the application frame based on the depth data at the particular resolution.

20. The non-transitory memory of claim 18, wherein the warped application frame is displayed at a third time that corresponds to a timing signal associated with the display; and wherein a difference between the second time at which the environmental data indicating the pose is obtained and the third time at which the warped application frame is displayed matches an amount of time associated with warping the application frame.

* * * * *